(12) United States Patent
Okuno et al.

(10) Patent No.: US 9,475,704 B2
(45) Date of Patent: Oct. 25, 2016

(54) METHOD FOR MANUFACTURING FATTY ACID METAL SALT PARTICLE, AND FATTY ACID METAL SALT PARTICLE

(71) Applicant: FUJI XEROX CO., LTD., Tokyo (JP)

(72) Inventors: Hiroyoshi Okuno, Kanagawa (JP); Junichi Tomonaga, Kanagawa (JP); Takeshi Iwanaga, Kanagawa (JP); Shunsuke Nozaki, Kanagawa (JP); Hideaki Yoshikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 274 days.

(21) Appl. No.: 13/911,330

(22) Filed: Jun. 6, 2013

(65) Prior Publication Data

US 2014/0178813 A1    Jun. 26, 2014

(30) Foreign Application Priority Data

Dec. 26, 2012 (JP) ................. 2012-283043

(51) Int. Cl.
| | |
|---|---|
| *G03C 3/00* | (2006.01) |
| *C09D 7/00* | (2006.01) |
| *C01B 33/18* | (2006.01) |
| *C01B 13/14* | (2006.01) |
| *C09C 1/36* | (2006.01) |
| *C09C 3/08* | (2006.01) |
| *C09C 1/30* | (2006.01) |
| *B01J 13/12* | (2006.01) |

(52) U.S. Cl.
CPC ........... *C01B 33/18* (2013.01); *B01J 13/12* (2013.01); *C01B 13/145* (2013.01); *C09C 1/3063* (2013.01); *C09C 1/3676* (2013.01); *C09C 3/08* (2013.01); *C01P 2004/62* (2013.01); *C01P 2004/64* (2013.01); *C01P 2004/84* (2013.01); *C01P 2004/86* (2013.01); *C01P 2006/40* (2013.01); *Y02P 20/544* (2015.11)

(58) Field of Classification Search
USPC .......... 430/111.2, 137.13, 124.1, 108.7, 124; 106/431, 430, 466, 44; 508/144, 165; 428/402–402.24, 403, 404, 407, 321.1, 428/474.4; 427/331, 389.9, 212, 427/213–213.36, 483, 256
See application file for complete search history.

(56) References Cited

U.S. PATENT DOCUMENTS

| | | |
|---|---|---|
| 2004/0209081 A1 | 10/2004 | Hagihara et al. |
| 2005/0196360 A1* | 9/2005 | Comte et al. .............. 424/59 |

FOREIGN PATENT DOCUMENTS

| | | |
|---|---|---|
| CN | 1197081 A | 10/1998 |
| CN | 1449736 A | 10/2003 |
| JP | A-2001-296688 | 10/2001 |
| JP | A-2003-041147 | 2/2003 |

OTHER PUBLICATIONS

Fluidized bed coating at supercritical fluid conditions. Schreiber et al., Journal of Supercritical Fluids 24(2002) 137-151.*
May 5, 2016 Office Action issued in Chinese Application No. 201310285398.3.

* cited by examiner

*Primary Examiner* — Bijan Ahvazi
*Assistant Examiner* — S. Camilla Pourbohloul
(74) *Attorney, Agent, or Firm* — Oliff PLC

(57) ABSTRACT

A method for manufacturing a fatty acid metal salt particle includes forming a coating layer including a fatty acid metal salt on a surface of a core material particle in supercritical carbon dioxide.

10 Claims, No Drawings

METHOD FOR MANUFACTURING FATTY ACID METAL SALT PARTICLE, AND FATTY ACID METAL SALT PARTICLE

CROSS-REFERENCE TO RELATED APPLICATIONS

This application is based on and claims priority under 35 USC 119 from Japanese Patent Application No. 2012-283043 filed Dec. 26, 2012.

BACKGROUND

Technical Field

The present invention relates to a method for manufacturing a fatty acid metal salt particle, and a fatty acid metal salt particle.

SUMMARY

According to an aspect of the invention, there is provided a method for manufacturing a fatty acid metal salt particle including: forming a coating layer including a fatty acid metal salt on a surface of a core material particle in supercritical carbon dioxide.

DETAILED DESCRIPTION

Fatty Acid Metal Salt Particle

Exemplary embodiments of the invention will be described.

The fatty acid metal salt particle according to the present exemplary embodiment has a core material particle and a coating layer which includes a fatty acid metal salt formed on a surface of the core material particle and is formed in supercritical carbon dioxide. In other words, in the exemplary embodiment, a coating layer including a fatty acid metal salt is formed on a surface of a core material particle to form a fatty acid metal salt particle.

The fatty acid metal salt particle according to the exemplary embodiment has the coating layer including a fatty acid metal salt formed on the surface of the core material particle in the supercritical carbon dioxide.

In a case in which the coating layer including a fatty acid metal salt is formed on the surface of the core material particle, when the coating layer is formed on the surface in the supercritical carbon dioxide, the fatty acid metal salt is dissolved in the supercritical carbon dioxide.

Here, since the supercritical carbon dioxide has a characteristic of an extremely low surface tension, it is considered that the fatty acid metal salt in a state of being dissolved in the supercritical carbon dioxide becomes easily diffusible onto surface of silica particle together with the supercritical carbon dioxide, and is attached to the entire surface of the core material particle in a state in which it becomes difficult for the metal salt to be distributed unevenly.

In addition, it is considered that, even when the core material particle is, for example, particle having fine pores on surface, such as sol-gel silica particle, due to the above characteristic of the supercritical carbon dioxide, the fatty acid metal salt in a state of being dissolved in the supercritical carbon dioxide becomes easily diffusible not only onto the surface of the sol-gel silica particle but also deep into the pores, and is attached to the entire surface of the sol-gel silica particle as long as the coating layer is formed in the supercritical carbon dioxide.

As a result, it is considered that the contact area between the core material surface and the coating layer improves, and the adhesiveness thereof is high.

Therefore, in the fatty acid metal salt according to the exemplary embodiment, flaking of the coating layer including the fatty acid metal salt is suppressed.

Meanwhile, while a fatty acid metal salt particle, which has been used conventionally and has no layer structure, has a particle diameter of 3 µm to 10 µm, and tends to become a particle having a wide particle size distribution, since the method for manufacturing a fatty acid metal salt according to the exemplary embodiment is a manufacturing method in which the core material particle is coated, it is possible to manufacture a fatty acid metal salt particle having a small particle diameter (for example, on a nanometer size) and a narrow particle size distribution by selecting the core material particle depending on purpose.

As a result, it is considered that the fluidity and charging property of the fatty acid metal salt particle improve.

In addition, it is considered that the fatty acid metal salt particle improves in terms of heat storing properties.

Hereinafter, the exemplary embodiments of the invention will be described in detail.

First, the coating layer and the core material particle which configure the fatty acid metal salt particle according to the exemplary embodiment will be described.

Coating Layer

The coating layer includes a fatty acid metal salt.

Examples of the fatty acid metal salt include metal salts of fatty acid (for example, fatty acid, such as stearic acid, 12-hydroxy stearic acid, behenic acid, montanic acid, lauric acid and other organic acids) and metals, such as calcium, zinc, magnesium, aluminum and others (Na, Li and the like).

Specific examples of the fatty acid metal salt include zinc stearate, calcium stearate, aluminum stearate, iron stearate, copper stearate, magnesium palmitate, calcium palmitate, manganese oleate, lead oleate, zinc laurate, calcium laurate, zinc ricinoleate, zinc octylate and the like.

Among the above, it is preferable that the fatty acid metal salt be zinc stearate, zinc laurate, zinc ricinoleate or zinc octylate, more preferably zinc stearate or zinc laurate, and still more preferably zinc stearate.

Here, it is considered that, in a case in which the metal of the fatty acid metal salt is zinc, a fatty acid metal salt particle, in which the fluidity improves and the charging property is maintained, is realized.

The reason is not clear, but it is considered to stem from the characteristics of zinc.

The fatty acid metal salt included in the coating layer may be one element or plural elements.

Core Material Particle

A well-known particle having favorable dispersibility is used as the core material particle, and an example thereof includes an inorganic particle.

Examples of the inorganic particle include particle configured of silicon oxide (silica), aluminum oxide, zinc oxide, titanium oxide, tin oxide, iron oxide, magnesium oxide, calcium carbonate, calcium oxide or barium titanate.

The surface of the inorganic particle may not be hydrophobized, but it is more preferable that the surface be hydrophobized.

Among the above, the inorganic particle is preferably a particle configured of silica and titanium oxide, and a particle configured of silica (hereinafter referred to as silica particle) is more preferably from the viewpoint of improvement in charging property.

The silica particle may be silica particle obtained using any of wet methods (for example, a sol-gel method or the like) and dry methods (for example, a gas phase method or the like), and examples thereof include sol-gel silica particle, aqueous colloidal silica particle, alcoholic silica particle, fumed silica particle obtained using the gas phase method, and fused silica particle.

Among the above, the sol-gel silica particle obtained using the sol-gel method is preferable from the viewpoint of an improvement in the fluidity of the fatty acid metal salt particle and a possibility of obtaining the fatty acid metal salt particle having the maintained charging property since the particle size distribution of the silica particle becomes likely to be narrow.

The volume average particle diameter of the core material particle may be, for example, from 10 nm to 1000 nm, preferably 20 nm to 500 nm, and more preferably 50 nm to 300 nm.

The volume average particle diameter of the core material particle may be obtained from the 50% diameter (D50v) in the cumulative frequency of the volume particle diameter measured using an LS coulter (particle size measuring apparatus manufactured by Beckman Coulter, Inc.).

Method for Manufacturing a Fatty Acid Metal Salt Particle

The method for manufacturing a fatty acid metal salt particle of the exemplary embodiment is a method for manufacturing a fatty acid metal salt particle including a coating layer-forming process in which a coating layer including a fatty acid metal salt is formed on the surface of the core material particle in supercritical carbon dioxide.

Hereinafter, a method for manufacturing a fatty acid metal salt particle, to which the sol-gel silica particle (hereinafter referred to as silica particle) is applied as the core material particle, will be described. However, the method for manufacturing a fatty acid metal salt particle according to the exemplary embodiment is not limited to the following.

Meanwhile, in the method for manufacturing a fatty acid metal salt particle according to the exemplary embodiment, supercritical carbon dioxide is used in the coating layer-forming process, but supercritical carbon dioxide may be used in other manufacturing processes (for example, a solvent-removing process) of a fatty acid metal salt particle.

Examples of the method for manufacturing a fatty acid metal salt particle using supercritical carbon dioxide in other manufacturing processes include a method for manufacturing a fatty acid metal salt particle including a process for preparing a silica particle dispersion containing silica particle, which is applied as the core material particle, and a solvent including alcohol and water (hereinafter referred to as "dispersion-preparing process"), a process for communicating supercritical carbon dioxide so as to remove the solvent from the silica particle dispersion (hereinafter referred to as "solvent-removing process"), and the coating layer-forming process for forming a coating layer on the surface of the silica particle using a coating layer including a fatty acid metal salt in the supercritical carbon dioxide (hereinafter referred to as "coating layer-forming process")

In the method for manufacturing a fatty acid metal salt particle using supercritical carbon dioxide in other manufacturing processes, it is possible to more effectively manufacture a fatty acid metal salt particle, which is excellent in terms of the environmental stability of electrical resistance and charging property. In addition, the generation of coarse powder is more effectively suppressed.

The reasons are not clear, but may be considered as follows: 1) in a case in which the solvent of the silica particle dispersion is removed, due to a property of the supercritical carbon dioxide that "the surface tension does not work", the solvent is removed without the agglomeration of particles, which is caused by a liquid crosslinking force generated when the solvent is removed; 2) due to a property of the supercritical carbon dioxide that "the supercritical carbon dioxide is carbon dioxide at the critical temperature and pressure or higher, and has both the diffusivity of gas and the solubility of liquid", the supercritical carbon dioxide efficiently comes into contact with the solvent and dissolves the solvent at a relatively low temperature (for example, 250° C. or lower), and therefore the solvent in the silica particle dispersion is removed by removing the supercritical carbon dioxide which has dissolved the solvent without the generation of coarse powder, such as secondary agglomerate, due to the condensation of a silanol group; and the like.

Hereinafter, regarding the method for manufacturing a fatty acid metal salt particle, in which supercritical carbon dioxide is used in other manufacturing processes and the core material particle is silica particle, the respective processes will be described in detail.

Meanwhile, the method for manufacturing a fatty acid metal salt particle according to the exemplary embodiment will not be limited to the following, and may be, for example, 1) an aspect in which supercritical carbon dioxide is used only in the coating layer-forming process, 2) an aspect in which dry silica particle is prepared in advance, and the coating layer-forming process is sequentially carried out on the dry silica particle, 3) an aspect in which the respective processes are individually carried out, or the like.

Hereinafter, the respective processes will be described in detail.

Dispersion-Preparing Process

In the dispersion-preparing process, for example, a silica particle dispersion containing silica particles and a solvent including alcohol and water is prepared.

Specifically, in the dispersion-preparing process, for example, a silica particle dispersion is prepared using a wet method (for example, the sol-gel method or the like). Particularly, it is preferable that the silica particle dispersion be manufactured using the sol-gel method as the wet method, specifically, by causing a reaction (hydrolysis reaction or condensation reaction) of tetraalkoxysilane in a solvent of alcohol and water in the presence of an alkaline catalyst so as to generate silica particles.

The volume average particle diameter of the silica particles is adjusted depending on use of a fatty acid metal salt particle, and, for example, may be from 20 nm to 500 nm, and preferably from 50 nm to 300 nm.

The volume average particle diameter of the silica particles may be obtained from the 50% diameter (D50v) in the cumulative frequency of the volume particle diameter measured using an LS coulter (particle size measuring apparatus manufactured by Beckman Coulter, Inc.).

The shape of the silica particles may be any of a spherical shape or an irregular shape, but it is preferable that the shape be, for example, an irregular shape having a circularity of from 0.5 to 0.85 from the viewpoint of fluidity or heat-resistant stability.

The circularity of the silica particles refers to the average circularity of primary particles, and may be obtained as "100/SF2" by analyzing an image of the primary particles of the silica particles attached to the surfaces of resin particles using an image analysis software WinROOF (manufactured by Mitani Corporation) and calculating the degree using the following formula.

Formula: circularity $(100/SF2)=4\pi\times(A/I^2)$

In the formula, I represents the peripheral length of particles on an image, and A represents the projected area of particles.

In addition, the average of circularity may be obtained as a 50% of circularity in the cumulative frequency of the circularity of 100 primary particles obtained using the above image analysis.

In the dispersion-preparing process, for example, in a case in which the silica particles are obtained using a wet method, the silica particles are obtained in a state of a dispersion in which the silica particles are dispersed in a solvent (silica particle dispersion).

Here, when transferring to the solvent-removing process, in the silica particle dispersion being prepared, the mass ratio of water with respect to alcohol may be, for example, from 0.1 to 1.0, preferably from 0.15 to 0.5, and more preferably from 0.2 to 0.3.

In the silica particle dispersion, when the mass ratio of water with respect to alcohol is in the above range, only a small amount of coarse powder of the silica particles are generated after the coating layer-forming process, and it becomes easy to obtain silica particles having favorable electrical resistance.

When the mass ratio of water with respect to alcohol is below 0.1, since only a small number of silanol groups condense on the surfaces of the silica particles when removing the solvent in the solvent-removing process, a large amount of moisture is adsorbed on the surfaces of the silica particles after the removal of the solvent such that there are cases in which the electrical resistance of the silica particles becomes too low after the coating layer-forming process. In addition, when the mass ratio of water exceeds 1.0, a large amount of water remains when almost all the solvent in the silica particle dispersion is removed in the solvent-removing process, the silica particles easily agglomerate due to a liquid crosslinking force, and there are cases in which the silica particles are present in a form of coarse powder after the coating layer-forming process.

In addition, when transferring to the solvent-removing process, in the silica particle dispersion being prepared, the mass ratio of water with respect to the silica particles may be, for example, from 0.02 to 3, preferably from 0.05 to 1, and more preferably from 0.1 to 0.5.

In the silica particle dispersion, when the mass ratio of water with respect to the silica particles is in the above range, only a small amount of coarse powder of the silica particles are generated after the coating layer-forming process, and it becomes easy to obtain silica particles having favorable electrical resistance.

When the mass ratio of water with respect to the silica particles is below 0.02, since only a small number of silanol groups condense on the surfaces of the silica particles when removing the solvent in the solvent-removing process, a large amount of moisture is adsorbed on the surfaces of the silica particles after the removal of the solvent such that there are cases in which the electrical resistance of the silica particles becomes too low after the coating layer-forming process.

In addition, when the mass ratio of water exceeds 3, a large amount of water remains when almost all the solvent in the silica particle dispersion is removed in the solvent-removing process, and there are cases in which the silica particles easily agglomerate due to a liquid crosslinking force.

In addition, when transferring to the solvent-removing process, in the silica particle dispersion being prepared, the mass ratio of the silica particles with respect to the silica particle dispersion may be, for example, from 0.05 to 0.7, preferably from 0.2 to 0.65, and more preferably from 0.3 to 0.6.

When the mass ratio of the silica particles with respect to the silica particle dispersion is below 0.05, the amount of supercritical carbon dioxide being used increases in the solvent-removing process, and there are cases in which the productivity deteriorates.

In addition, when the mass ratio of the silica particles with respect to the silica particle dispersion exceeds 0.7, the distance between the silica particles in the silica particle dispersion decreases, and there are cases in which coarse powder is easily generated from the agglomeration or gelation of the silica particles.

Solvent-Removing Process

The solvent-removing process is a process in which, for example, supercritical carbon dioxide is communicated, and the solvent in the silica particle dispersion is removed.

That is, in the solvent-removing process, the supercritical carbon dioxide is brought into contact with the silica particle dispersion by communicating the supercritical carbon dioxide, thereby removing the solvent.

Specifically, in the solvent-removing process, for example, the silica particle dispersion is added into a closed reactor. After that, liquefied carbon dioxide is added to a closed reactor, heated, and the pressure in the reactor is increased using a high-pressure pump, thereby bringing carbon dioxide into a supercritical state. In addition, the supercritical carbon dioxide is put into the closed reactor, discharged, and communicated in the closed reactor, that is, in the silica particle dispersion.

Thereby, the supercritical carbon dioxide dissolves the solvent (alcohol and water) and is discharged outside the silica particle dispersion (outside the closed reactor) while entraining the solvent, thereby removing the solvent.

Here, the supercritical carbon dioxide refers to carbon dioxide at the critical temperature and pressure or higher, and has both diffusivity of gas and solubility of liquid.

The temperature condition for solvent removal, that is, the temperature of the supercritical carbon dioxide may be, for example, from 31° C. to 350° C., preferably from 60° C. to 300° C., and more preferably from 80° C. to 250° C.

When the temperature is below the above range, since it becomes difficult for the solvent to be dissolved in the supercritical carbon dioxide, there are cases in which the removal of the solvent becomes difficult. In addition, it is considered that there are cases in which coarse powder becomes easily generated due to a liquid crosslinking force of the solvent or the supercritical carbon dioxide. On the other hand, when the temperature is above the above range, it is considered that there are cases in which coarse powder, such as secondary agglomerate, becomes easily generated due to the condensation of the silanol groups on the surfaces of the silica particles.

The pressure condition for solvent removal, that is, the pressure of the supercritical carbon dioxide may be, for example, from 7.38 MPa to 40 MPa, preferably from 10 MPa to 35 MPa, and more preferably from 15 MPa to 25 MPa.

When the pressure is below the above range, there is a tendency that it becomes difficult to dissolve the solvent in the supercritical carbon dioxide, and, on the other hand, when the pressure is above the above range, there is a tendency that the facilities become expensive.

In addition, the amount of the supercritical carbon dioxide introduced into and exhausted from the closed reactor may be, for example, from 15.4 L/min/m$^3$ to 1540 L/min/m$^3$, and preferably from 77 L/min/m$^3$ to 770 L/min/m$^{t3}$.

When the introduction and exhaust amount is less than 15.4 L/min/m$^3$, it takes a long time to remove the solvent, and therefore there is a tendency that the productivity becomes likely to deteriorate.

On the other hand, when the introduction and exhaust amount is 1540 L/min/m$^3$ or more, the supercritical carbon dioxide passes rapidly (the so-called short-pass phenomenon), the contact time with the silica particle dispersion becomes short, and there is a tendency that it becomes difficult to efficiently remove the solvent.

After the solvent-removing process and before the coating layer-forming process, the surfaces of the silica particles may be subjected to a hydrophobizing process with a hydrophobizing agent.

Hydrophobizing Process

The hydrophobizing process is a process in which, subsequent to the solvent-removing process, a hydrophobizing treatment is carried out on the surfaces of the hydrophilic silica particles using a hydrophobizing agent in the supercritical carbon dioxide.

That is, in the present process, for example, before the transition from the solvent-removing process, the hydrophobizing treatment is carried out on the surfaces of the hydrophilic silica particles using the hydrophobizing agent in the supercritical carbon dioxide without opening to the atmosphere.

Specifically, in the process, for example, after the introduction and exhaust of the supercritical carbon dioxide into the closed reactor in the solvent-removing process are stopped, the temperature and pressure of the closed reactor are adjusted, and a constant proportion of the hydrophobizing agent is added into the hydrophilic silica particles in a state in which the supercritical carbon dioxide is present in the closed reactor. In addition, in a state in which the above state is maintained, that is, in the supercritical carbon dioxide, the hydrophobizing agent is reacted so as to carry out the hydrophobizing treatment of the hydrophilic silica particles. Examples of the hydrophobizing agent include well-known organic silicon compounds having an alkyl group (for example, a methyl group, an ethyl group, a propyl group, a butyl group or the like), and specific examples thereof include silazane compounds (for example, hexamethyldisilazane, tetramethyldisilazane, and the like) and silane compounds, such as methyltrimethoxysilane, dimethyldimethoxysilane, trimethylchlorosilane, trimethylmethoxysilane; and the like. One or plural hydrophobizing agents may be used.

Among the above hydrophobizing agents, an organic silicon compound having a trimethyl group, such as trimethylmethoxysilane or hexamethyldisilazane, is preferable.

The amount of the hydrophobizing agent used is not particularly limited; however, in order to obtain a hydrophobizing effect, the amount may be, for example, from 1% by weight to 60% by weight, preferably from 5% by weight to 40% by weight, and more preferably from 10% by weight to 30% by weight with respect to the hydrophilic silica particles.

Here, the temperature conditions of the hydrophobizing treatment (the temperature condition under the reaction), that is, the temperature of the supercritical carbon dioxide may be, for example, from 80° C. to 300° C., preferably from 100° C. to 300° C., and more preferably from 150° C. to 250° C.

When the temperature is below the above range, the reactivity between the hydrophobizing agent and the surfaces of the hydrophilic silica particles deteriorates. On the other hand, when the temperature is above the above range, a condensation reaction proceeds between the silanol groups of the hydrophilic silica particles, which results in the reduction of the reaction sites, and there are cases in which it becomes difficult for the degree of hydrophobization to improve.

Meanwhile, the pressure condition of the hydrophobizing treatment (the pressure condition under the reaction), that is, the pressure of the supercritical carbon dioxide does not matter as long as the above density is satisfied, but may be, for example, from 8 MPa to 30 MPa, preferably from 10 MPa to 25 MPa, and more preferably from 15 MPa to 20 MPa.

Coating Layer-Forming Process

The present process is a process in which, subsequent to the solvent-removing process and the hydrophobizing process, a coating layer including a fatty acid metal salt is formed on the surface of the silica particle in the supercritical carbon dioxide.

That is, in the coating layer-forming process, for example, before the transition from the solvent-removing process and the hydrophobizing process, without opening to the atmosphere, a solution for forming a coating layer including a fatty acid metal salt, which will be described below, is added in the supercritical carbon dioxide so as to form coating layer on the surface of the silica particle.

Specifically, in the coating layer-forming process, for example, after the introduction and exhaust of the supercritical carbon dioxide into the closed reactor in the solvent-removing process and the hydrophobizing process are stopped, the temperature and pressure in the closed reactor are adjusted, and a constant proportion of the solution for forming a coating layer is added to the silica particle in a state in which the supercritical carbon dioxide is present in the closed reactor. In addition, in a state in which the above state is maintained, that is, in the supercritical carbon dioxide, a coating layer is formed on the core material particle.

The solution for forming a coating layer is prepared by, for example, mixing the above fatty acid metal salt and a solvent.

As the solvent, a well-known organic solvent that may dissolve the fatty acid metal salt is used. Specific examples thereof include aromatic hydrocarbon solvents (for example, toluene, xylene, ethyl benzene and tetralin); aliphatic or alicyclic hydrocarbon solvents (for example, n-hexane, n-heptane, cyclohexane and the like); halogen solvents (for example, methyl chloride, methyl bromide, methyl iodide, methylene dichloride, carbon tetrachloride, trichloroethylene, perchloroethylene, and the like); ester or ester ether solvents (for example, ethyl acetate, butyl acetate, methoxy butyl acetate, methyl cellosolve acetate, ethyl cellosolve acetate, and the like); ether solvents (for example, diethyl ether, tetrahydrofuran, dioxane, ethyl cellosolve, butyl cellosolve, propylene glycol monomethyl ether, and the like); ketone solvents (for example, acetone, methyl ethyl ketone, methyl isobutyl ketone, di-n-butyl ketone, cyclohexanone, and the like); alcohol solvents (for example, methanol, ethanol, n-propanol, isopropanol, n-butanol, isobutanol, t-butanol, 2-ethyl hexyl alcohol, benzyl alcohol, and the like); amide solvents (for example, dimethylformamide, dimethylacetamide, and the like); sulfoxide solvents (for example, dimethyl sulfoxide and the like); heterocyclic compound solvents (for example, N-methylpyrrolidone and the like), mixtures of two or more of these solvents, and the like. Among the above, it is preferable to use toluene, xylene, methanol or methyl ethyl ketone.

The fatty acid metal salt may be from 1% by weight to 50% by weight, preferably from 5% by weight to 30% by weight, and more preferably from 10% by weight to 20% by weight with respect to the solvent.

In the coating layer-forming process, it is sufficient that the reaction is caused in the supercritical carbon dioxide (that is, in the atmosphere of the supercritical carbon dioxide), and a surface treatment may be carried out while the supercritical carbon dioxide is communicated (that is, the supercritical carbon dioxide is introduced into and exhausted from the closed reactor) or is not communicated.

The amount of the core material particles with respect to the volume of the reactor (that is, the feed amount) may be, for example, from 50 g/L to 600 g/L, preferably from 100 g/L to 500 g/L, and more preferably from 150 g/L to 400 g/L.

When the amount is smaller than the above range, the concentration of the solution for forming a coating layer in the supercritical carbon dioxide decreases, the contact probability with the surfaces of the core material particles decreases, and it becomes difficult for the formation of the coating layer to proceed. On the other hand, when the amount is larger than the above range, the concentration of the solution for forming a coating layer in the supercritical carbon dioxide increases, the solution for forming a coating layer is not fully dissolved in the supercritical carbon dioxide, and is poorly dispersed, and coarse agglomerates become likely to be generated.

The density of the supercritical carbon dioxide in the supercritical carbon dioxide may be, for example, from 0.1 g/ml to 0.6 g/ml, preferably from 0.1 g/ml to 0.5 g/ml, and more preferably from 0.2 g/ml to 0.4 g/ml.

When the density is the above range or more, the diffusivity of the supercritical carbon dioxide deteriorates, and it becomes difficult to form more uniform coating layers on the surfaces of silica. In addition, when the density is the above range or less, the solubility of the fatty acid metal salt in the supercritical carbon dioxide decreases, and it becomes difficult to form more uniform coating layers on the surfaces of silica.

Meanwhile, the density of the supercritical carbon dioxide is adjusted by temperature, pressure and the like.

Here, the temperature conditions of the coating layer-forming process (the temperature condition under the reaction), that is, the temperature of the supercritical carbon dioxide may be, for example, from 60° C. to 300° C., preferably from 90° C. to 230° C., and more preferably from 120° C. to 200° C.

When the temperature is the above range or more, the particles become likely to agglomerate due to the condensation of the silanol groups on the silica surfaces. In addition, when the temperature is the above range or less, the solubility of the fatty acid metal salt in the supercritical carbon dioxide decreases, and it becomes difficult to form more uniform coating layers on the surfaces of silica.

Meanwhile, the pressure condition of the coating layer-forming process (the pressure condition under the reaction), that is, the pressure of the supercritical carbon dioxide does not matter as long as the above density is satisfied, but may be, for example, from 10 MPa to 30 MPa, preferably from 12 MPa to 25 MPa, and more preferably from 15 MPa to 20 MPa.

The addition amount of the solution for forming a coating layer is adjusted depending on the amount of the silica particles so that the coverage of the coating layer is within a range described below.

The characteristics of the fatty acid metal salt particle

Coverage

The coverage of the coating layer on the fatty acid metal salt particle may be from 20% to 100%, preferably from 30% to 100%, and more preferably from 50% to 100%.

The coverage of the fatty acid metal salt on the surface of the fatty acid metal salt particle is measured using an X-ray photoelectron spectroscopic apparatus (XPS). The detail of the measuring method is as follows.

As the X-ray photoelectron spectroscopic apparatus, a JPS9010 (manufactured by JEOL Ltd.) is used. For example, in a case in which the coverage is measured using a zinc stearate-coated silica particle as an example, the coverage is determined based on the value of the ratio of zinc to all elements.

The value of the ratio of zinc to all elements, which is measured from a single member of the silica particle which has not yet been coated with zinc stearate is set to 0%, the value of the ratio of zinc to all elements, which is measured from a single member of zinc stearate is set to 100%, and the coverage of zinc stearate on the surface of the zinc stearate-coated silica particle is measured.

Meanwhile, the upper limit of the coverage of the fatty acid metal salt is 100%, and the lower limit is 0%.

Coating Amount

The coating amount of the fatty acid metal salt particle according to the exemplary embodiment may be from 1% by weight to 30% by weight, preferably from 3% by weight to 25% by weight, and more preferably from 5% by weight to 20% by weight with respect to the total weight of the fatty acid metal salt particle.

The coating amount is measured using a fluorescent X-ray, and, specifically, is measured in the following manner.

For example, the measurement intensity of zinc measured from a single member of the silica particle which has not yet been coated with zinc stearate is set to 0% by weight, the measurement intensity of zinc measured from a single member of zinc stearate is set to 100% by weight, and the coating amount of zinc stearate on the zinc stearate-coated silica particle is measured in terms of % by weight.

The volume average particle diameter of the fatty acid metal salt particle is adjusted in accordance with the use of the fatty acid metal salt particle, and may be, for example, from 10 nm to 1000 nm, preferably from 20 nm to 500 nm, and more preferably from 50 nm to 300 nm.

In addition, the volume average particle size distribution index (GSDv) of the fatty acid metal salt particle may be, for example, from 1.10 to 1.70, preferably from 1.15 to 1.60, and more preferably from 1.15 to 1.50.

A variety of the average particle diameters and particle size distribution indexes of the fatty acid metal salt particle are measured using an LS Coulter (particle size measuring apparatus manufactured by Beckman Coulter, Inc.)

The cumulative distributions of the volume and the number are drawn from the small diameter side with respect to particle size ranges (channels), which are divided based on the obtained particle size distribution, the particle diameter, at which the accumulation reaches 16%, is defined as the volume particle diameter D16v and the number particle diameter D16p, the particle diameter, at which the accumulation reaches 50%, is defined as the volume average particle diameter D50v and the number average particle diameter D50p, and the particle diameter, at which the accumulation reaches 84%, is defined as the volume particle diameter D84v and the number particle diameter D84p.

Using the above elements, the volume average particle size distribution index (GSDv) is calculated using $(D84v/D16v)^{1/2}$ and the number average particle size distribution index (GSDp) is calculated using $(D84p/D16p)^{1/2}$.

Use of the Fatty Acid Metal Salt Particle

The fatty acid metal salt particle obtained using the method for manufacturing a fatty acid metal salt particle according to the exemplary embodiment is used in well-known use for which the fatty acid metal salt particle is used; however, since the particle is the fatty acid metal salt particle in which the flaking of a coating layer including a fatty acid metal salt is suppressed, the particle is preferably used particularly in, for example, an external additive of a toner, a fluidization aid of a powder coating, a release agent for resin molding and a lubricant for inorganic fine particles.

EXAMPLES

Hereinafter, the exemplary embodiment will be described more specifically and in detail using examples and comparative examples, but the exemplary embodiment is not limited to the examples in any manner. In addition, "parts" indicates "parts by weight" unless particularly otherwise described.

Preparation of Solutions for Forming a Coating Layer

Solution for Forming a Coating Layer 1

Zinc stearate and toluene are mixed in the following conditions, thereby preparing a solution for forming a coating layer 1.

Zinc stearate (10 parts by weight) is added to toluene (90 parts by weight), and the mixture is stirred at 80° C. for 20 minutes, thereby preparing the solution for forming a coating layer 1.

Solution for Forming a Coating Layer 2

Zinc laurate and toluene are mixed in the following conditions, thereby preparing a solution for forming a coating layer 2.

Zinc laurate (10 parts by weight) is added to toluene (90 parts by weight), and the mixture is stirred at 80° C. for 20 minutes for dissolution, thereby preparing the solution for forming a coating layer 2.

Solution for Forming a Coating Layer 3

Calcium stearate and toluene are mixed in the following conditions, thereby preparing a solution for forming a coating layer 3.

Calcium stearate (10 parts by weight) is added to toluene (90 parts by weight), and the mixture is stirred at 80° C. for 20 minutes for dissolution, thereby preparing the solution for forming a coating layer 3.

EXAMPLES

Example 1

A coating layer including a fatty acid metal salt is formed on the surface of a silica particle (hydrophobic fumed silica, product name: RX50, manufactured by Aerosil) as described below. Meanwhile, when the coating layer is formed, an apparatus equipped with a carbon dioxide cylinder, a carbon dioxide pump, an entrainer pump, a stirrer-attached autoclave (volume of 500 ml) and a pressure valve is used.

First, the powder of hydrophilic fumed silica particles (20 parts by weight) having a volume average particle diameter of 40 nm is added into the stirrer-attached autoclave (volume of 500 ml).

Next, liquefied carbon dioxide is added into the autoclave, the pressure is increased using the carbon dioxide pump while increasing the temperature using a heater, and the inside of the autoclave is set to a supercritical state of 150° C. and 15 MPa. In addition, after the stirrer is rotated at 100 rpm, the solution for forming a coating layer 1 (20 parts by weight) is added to the autoclave using the entrainer pump, and is held for 30 minutes while being stirred. After that, the stirring is stopped, the pressure valve is opened so as to relieve the pressure in the autoclave to the atmospheric pressure and to decrease the temperature to room temperature (25° C.)

A fatty acid metal salt particle having the coating layer including a fatty acid metal salt is obtained in the above manner.

Example 2

A fatty acid metal salt particle is obtained in the same manner as in Example 1 except that the silica particle, which is applied as the core material particle, is changed to titanium oxide particle (product name: MT 150, manufactured by TAYCA, volume average particle diameter: 20 nm) according to Table 1.

Example 3

Methanol (200 parts) and 10% ammonia water (33 parts) are added to a 1.5 L glass reaction container equipped with a stirrer, a dripping nozzle and a thermometer, and mixed, thereby obtaining an alkali catalyst solution. After the alkali catalyst solution is adjusted to 30° C., while the solution is stirred, the flow rate is adjusted so that the amount of NH3 becomes 0.27 mol with respect to 1 mol of the total supply amount of tetraalkoxysilane supplied per 1 minute, and tetramethoxysilane (100 parts) and 3.8% ammonia water (79 parts) begin to be added at the same time. In addition, the solution is added dropwise over 60 minutes, thereby obtaining a hydrophilic silica particle dispersion (the concentration of the solid content: 9.5% by weight) having a volume average particle diameter of 120 nm and an irregular shape with a circularity of 0.82. Meanwhile, the supply amount of tetraalkoxysilane is set to 0.0018 mol/(mol·min) with respect to the mole number of the alcohol in the alkali catalyst solution.

After that, the obtained silica particle dispersion is condensed to a concentration of the solid content of 40% by weight using a rotary filter R-fine (manufactured by Kotobuki Industries Co., Ltd.). The condensed silica particle dispersion is used as a silica particle dispersion A.

As described below, in conjunction with the solvent-removing process of the silica particle dispersion, a coating layer including a fatty acid metal salt is formed with respect to the silica particle (sol-gel silica particle). Meanwhile, an apparatus equipped with a carbon dioxide cylinder, a carbon dioxide pump, an entrainer pump, a stirrer-attached autoclave (volume of 500 ml) and a pressure valve is used to form the coating layer.

First, the silica particle dispersion A (300 parts) is added into a stirrer-attached autoclave (volume of 500 ml), and the stirrer is rotated at 100 rpm. After that, liquidified carbon dioxide is added into the autoclave, the pressure is increased using the carbon dioxide pump while increasing the temperature using a heater, and the inside of the autoclave is set to a supercritical state of 150° C. and 15 MPa. The supercritical carbon dioxide is communicated using the carbon dioxide pump while holding the inside of the autoclave at 15 MPa using the pressure valve, thereby removing methanol and water from the silica particle dispersion A.

Next, when the communication amount (integrated amount: measured as a communication amount of carbon dioxide in a standard state) of the communicated supercritical carbon dioxide reaches 500 parts, the communication of the supercritical carbon dioxide is stopped.

After that, the temperature is maintained at 150° C. using a heater, the pressure is maintained at 15 MPa using the carbon dioxide pump, hexamethyldisilazane (30 parts by weight) is added into the autoclave using the entrainer pump in a state in which the supercritical state of carbon dioxide is maintained in the autoclave, and the state is held for 30 minutes, thereby carrying out a hydrophobizing treatment. After that, the solution for forming a coating layer 1 (120 parts by weight) is added into the autoclave using the entrainer pump, and, furthermore, held for 30 minutes while being stirred. After that, the stirring is stopped, the pressure valve is opened so as to release the pressure in the autoclave to the atmospheric pressure and to decrease the temperature to room temperature (25° C.)

A fatty acid metal salt particle is obtained in the above manner.

Example 4

A fatty acid metal salt particle is obtained in the same manner as in Example 3 except that the solution for forming a coating layer is changed from the solution for forming a coating layer 1 to the solution for forming a coating layer 2 according to Table 1.

Example 5

A fatty acid metal salt particle is obtained in the same manner as in Example 3 except that the solution for forming a coating layer is changed from the solution for forming a coating layer 1 to the solution for forming a coating layer 3 according to Table 1.

Example 6

A hydrophilic silica particle dispersion (the concentration of the solid content: 9.5% by weight) having a volume average particle diameter of 100 nm and a spherical shape with a circularity of 0.93 is obtained in the same manner as in Example 1 except that the 10% ammonia water, which is used to prepare the alkali catalyst solution, is set to 45 parts. The hydrophilic silica particle dispersion is condensed to a concentration of the solid content of 40% by weight in the same manner as in Example 1, thereby preparing a silica particle dispersion B. The solvent of the silica particle dispersion B is removed in the same manner as in Example 1, a hydrophobizing treatment is carried out using hexamethyldisilazane, and then, furthermore, a coating layer is formed using the solution for forming a coating layer 1 (90 parts by weight) in the same manner as in Example 1, thereby obtaining a fatty acid metal salt particle.

Example 7

A fatty acid metal salt particle is obtained in the same manner as in Example 5 except that the solution for forming a coating layer is changed from the solution for forming a coating layer 1 (90 parts by weight) to the solution for forming a coating layer 2 (100 parts by weight).

COMPARATIVE EXAMPLES

Comparative Example 1

The fumed silica particle (100 parts by weight) of Example 1 is dispersed in methanol (2000 parts by weight), zinc stearate (40 parts by weight) is dissolved in the solution, then, the solution is well mixed, the pressure is decreased while heating the solution, and the solution is dried.

After that, the obtained dried substance is crushed, and a silica particle having a fatty acid metal salt attached to the surface thereof is obtained.

Comparative Example 2

A fatty acid metal salt particle having no layer structure (product name: ZNS, manufactured by ADEKA Corporation, volume average particle diameter: 10 μm) is prepared.

Characteristics of the Obtained Particle

The characteristics of the particle (the fatty acid metal salt particle, the silica particle to which a fatty acid metal salt is attached or pure fatty acid metal salt particle) obtained from the respective examples are confirmed with respect to the following aspects. The confirmed contents are as follows. The results are described in Table 2.

Flaking Amount of the Coating Layer

The flaking amount of the coating layer is measured in the following manner.

First, the fatty acid metal salt particle (5 g), water (100 ml) and an appropriate amount of a surfactant are put into a beaker, and the fatty acid metal salt particle and the water are well mixed. The beaker is put into a constant temperature at 40° C., the probe of an ultrasonic homogenizer US-300TCVP-3 is put into the water inside the beaker, and the probe is shaken for 5 minutes at an ultrasonic wave intensity of 200 mV. After the shaking, solid and liquid are separated using a centrifugal separator, and the supernatant solution is collected. The centrifugally separated solid content is filtered using filter paper, whose weight has been measured, and dried, and the weight of the dried solid content is measured.

The flaking amount of the coating layer is calculated in the following manner.

The flaking amount of the coating layer (%)=(the weight of the fatty acid metal salt particle before the treatment−the weight of the fatty acid metal salt particle after the treatment)÷the weight of the fatty acid metal salt particle before the treatment×100

Meanwhile, a small flaking amount is preferable, specifically, the allowable range is less than 20%, and the flaking amount is more preferably less than 10%.

Coating Amount and Coverage

The coverage and coating amounts of the coating layers of particles obtained from the respective examples are obtained using the method described above.

Volume average particle diameter and volume average particle size distribution

The volume average particle diameters and volume average particle size distributions of the particles obtained from the respective examples are obtained using the method described above.

Evaluation

First, the particles (3 parts by weight) obtained from each of the examples are mixed with the spherical particles of a styrene/butyl acrylate (85/15) copolymer resin (molecular weight Mw: 60,000, glass transition temperature: 60° C.) (100 parts by weight) having a volume average particle diameter of 8 μm for 60 seconds using a sample mill, thereby manufacturing complex particles to which the particles obtained from each of the examples and the resin particles are attached.

In addition, the complex particles (3 parts by weight) and ferrite carrier (30 parts by weight) having a volume average particle diameter of 50 μm are mixed for 120 seconds using a tubular mixer, thereby obtaining a particle mixture.

Fluidity

The loose apparent specific gravity and the compact apparent specific gravity of the complex particles are measured using a powder tester (manufactured by Hosokawa Micron Group), the compaction ratio is obtained from the ratio between the loose apparent specific gravity and the compact apparent specific gravity using the following formula, and the fluidity of the particles is evaluated using the calculated compaction ratio.

Formula: compaction ratio=[(The compact apparent specific gravity)−(the loose apparent specific gravity)]/the compact apparent specific gravity Meanwhile, the "loose apparent specific gravity" is a measured value derived by packing a specimen cup having a volume of 100 cm$^3$ with the complex particles and weighing the complex particles, and refers to the packing specific gravity in a state in which the complex particles are naturally dropped in the specimen cup. The "compact apparent specific gravity" refers to an apparent specific gravity in a state in which the complex particles are rearranged by de-aerating the specimen cup in the state of the loose apparent specific gravity through tapping, and are thus more densely packed.

Meanwhile, a small compaction ratio is preferable since the fluidity is high, the allowable range is less than 0.45, the compaction ratio is more preferably 0.3 to less than 0.45, and still more preferably less than 0.3.

The compaction ratios are calculated in the above manner for the particle mixture before and after allowing the particle mixture to stand for 18 hours in an environment of 32° C. and 85% RH, the compaction ratios are compared so as to compare the fluidities, and the maintainability of the fluidity is evaluated.

Charging Property

The particle mixture manufactured above is allowed to stand for 18 hours in an environment of 28° C. and 85% RH, and the blow-off electric charge amounts of the particle mixture before and after the standing are measured. In addition, the electric charge amounts are compared using the following formula, thereby calculating the maintainability of the charging property.

Maintainability of the charging property=(the absolute value of the electric charge amount after the standing)÷(the absolute value of the electric charge amount before the standing)

The maintainability of the charging property may be allowed as long as the absolute value of the electric charge amount after the standing is from 15 μC/g to 40 μC/g, and the maintainability of the charging property is 0.6 or more. The maintainability is from more preferably from 0.6 to less than 0.7, still more preferably from 0.7 to less than 0.8, and most preferably 0.8 or more.

Heat Storage

The heat storing property (blocking resistance) is evaluated by allowing the particle mixture manufactured above to stand in an environment of 40° C. and 90% RH for 18 hours, and carrying out the following measurement on the particle mixture before and after the standing. Specifically, a powder tester (manufactured by Hosokawa Micron Group) is used, meshes with apertures of 53 μm, 45 μm and 38 μm are arrayed in series from the top, the particle mixture (exactly weighed to 2 g) is injected onto the mesh with an aperture of 53 μm, the powder tester is shaken for 90 seconds within an amplitude of 1 mm, the weights of the particle mixture remaining on the respective meshes after the shaking are measured, and the heat storing property is obtained using the following formula and evaluated.

Heat storing property=[(the weight of the particle mixture on the mesh with an aperture of 53 μm)×0.5+(the weight of the particle mixture on the mesh with an aperture of 45 μm)×0.3+(the weight of the particle mixture on the mesh with an aperture of 38 μm)×0.1]×100/(the weight of the particle mixture used for the measurement) (%)

It is needless to say that small heat storage is preferable, but there is no problem as long as the heat storage is 20% or less.

TABLE 1

| | Core material particles | | Coating layer | |
|---|---|---|---|---|
| | Type | Volume average particle diameter (nm) | Type of a fatty acid metal salt | Forming method |
| Example 1 | Fumed silica | 40 | Zinc stearate | In supercritical carbon dioxide |
| Example 2 | Titanium oxide | 20 | Zinc stearate | In supercritical carbon dioxide |
| Example 3 | Sol-gel silica | 120 | Zinc stearate | In supercritical carbon dioxide |
| Example 4 | Sol-gel silica | 120 | Zinc laurate | In supercritical carbon dioxide |
| Example 5 | Sol-gel silica | 120 | Calcium stearate | In supercritical carbon dioxide |
| Example 6 | Sol-gel silica | 100 | Zinc stearate | In supercritical carbon dioxide |
| Example 7 | Sol-gel silica | 100 | Zinc laurate | In supercritical carbon dioxide |
| Comparative Example 1 | Fumed silica | 40 | Zinc stearate | After heating and mixing, crushing |
| Comparative Example 2 | — | — | Zinc stearate | — |

TABLE 2

| | Characteristics of the obtained particles | | | | | Evaluation | | | | | | |
|---|---|---|---|---|---|---|---|---|---|---|---|---|
| | | | | | | Fluidity | | Charging property | | | | |
| | Volume average particle diameter (nm) | Volume average particle size distribution | Coverage (%) | Coating amount (weight %) | Flaking amount of the coating layer (weight %) | Compaction ratio before standing | Compaction ratio after standing | Electric charge amount (before standing) (μC/g) | Electric charge amount (after standing) (μC/g) | Maintainability of charging property | Heat storing property Before standing | Heat storing property After standing |
| Example 1 | 42 | 1.45 | 90 | 8.9 | 10 | 0.32 | 0.35 | 38 | 28 | 0.74 | 11 | 18 |
| Example 2 | 20 | 1.2 | 92 | 9 | 12 | 0.28 | 0.32 | 30 | 24 | 0.8 | 5 | 12 |
| Example 3 | 120 | 1.35 | 92 | 9 | 8 | 0.3 | 0.32 | 32 | 26 | 0.81 | 6 | 10 |
| Example 4 | 120 | 1.35 | 93 | 9.1 | 9 | 0.29 | 0.32 | 33 | 25 | 0.76 | 5 | 11 |
| Example 5 | 120 | 1.35 | 91 | 9.1 | 8 | 0.32 | 0.34 | 30 | 21 | 0.7 | 7 | 12 |
| Example 6 | 100 | 1.16 | 94 | 6.9 | 5 | 0.27 | 0.32 | 34 | 28 | 0.82 | 8 | 16 |
| Example 7 | 100 | 1.17 | 98 | 7.7 | 6 | 0.28 | 0.31 | 35 | 27 | 0.77 | 7 | 15 |
| Comparative Example 1 | 45 | 1.48 | 62 | 8 | 55 | 0.33 | 0.46 | 35 | 20 | 0.57 | 12 | 35 |
| Comparative Example 2 | 10 μm | 1.7 | — | — | — | 0.45 | 0.52 | 30 | 22 | 0.73 | 40 | 55 |

It is found from the above results that, in the fatty acid metal salt particle of the examples, the flaking of the coating layer is suppressed compared to in the fatty acid metal salt particle of the comparative examples. In addition, it is found that, in the fatty acid metal salt particle of the examples, the fluidity is maintained, a change in the electric charge amount is suppressed, and a heat storing property is obtained even after the standing, compared to the particles of the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for manufacturing a fatty acid metal salt particle comprising:
   forming a coating layer including a fatty acid metal salt on a surface of a core material particle in supercritical carbon dioxide; and
   subjecting the core material particle to a hydrophobizing process before forming the coating layer including a fatty acid metal salt on a surface of a core material particle; wherein
   the core material particle is silica produced using a sol-gel method, and wherein the fatty acid metal salt is selected from zinc stearate, calcium stearate, aluminum stearate, iron stearate, copper stearate, magnesium palmitate, calcium palmitate, manganese oleate, lead oleate, zinc laurate, calcium laurate, zinc ricinoleate and zinc octylate.

2. The method for manufacturing a fatty acid metal salt particle according to claim 1,
   wherein a volume average particle diameter of the core material particles is from 10 nm to 1000 nm.

3. The method for manufacturing a fatty acid metal salt particle according to claim 1,
   wherein a metal of the fatty acid metal salt is zinc.

4. The method for manufacturing a fatty acid metal salt particle according to claim 1, comprising:
   preparing a silica particle dispersion containing silica particles, and a solvent including an alcohol and water.

5. The method for manufacturing a fatty acid metal salt particle according to claim 1,
   wherein a volume average particle diameter of the silica particles is from 50 nm to 1000 nm.

6. The method for manufacturing a fatty acid metal salt particle according to claim 1,
   wherein the silica particles have a circularity of from 0.5 to 0.85.

7. The method for manufacturing a fatty acid metal salt particle according to claim 1,
   wherein a content of the fatty acid metal salt is from 1% by weight to 30% by weight with respect to a total amount of particles of the fatty acid metal salt.

8. The method for manufacturing a fatty acid metal salt particle according to claim 1, wherein the hydrophobizing process comprises treating a surface of the core material particle with a hydrophobizing agent.

9. The method for manufacturing a fatty acid metal salt particle according to claim 8, wherein the hydrophobizing process is preformed subsequent to a solvent-removing process.

10. The method for manufacturing a fatty acid metal salt particle according to claim 9, wherein the solvent removing process comprises contacting a silica particle dispersion with supercritical carbon dioxide.

* * * * *